United States Patent [19]

Lagarde

[11] 4,195,771
[45] Apr. 1, 1980

[54] METHOD OF IDENTIFYING ARTICLES

[75] Inventor: Pierre Lagarde, Versailles, France

[73] Assignee: Metalimphy, Paris, France

[21] Appl. No.: 967,303

[22] Filed: Dec. 7, 1978

[30] Foreign Application Priority Data

Dec. 23, 1977 [FR] France ............................... 77 38997

[51] Int. Cl.² ........................ G06K 5/00; G06K 19/06
[52] U.S. Cl. .................................. 235/380; 235/493; 235/382
[58] Field of Search ....................... 235/382, 375, 380; 340/528, 529, 531

[56] References Cited

U.S. PATENT DOCUMENTS

| | | | |
|---|---|---|---|
| 3,790,754 | 2/1974 | Black et al. | 235/382 |
| 4,150,781 | 4/1979 | Silverman et al. | 235/382 |
| 4,151,405 | 4/1979 | Peterson | 235/382 |

*Primary Examiner*—Daryl W. Cook

*Attorney, Agent, or Firm*—Haseltine, Lake & Waters

[57] ABSTRACT

In the identification of an article provided with at least one identifying magnetic member, each identifying member is selected from one or more production batches each of which has a characteristic hysteresis loop which is virtually non-reproducible. The member is subjected to analysis of its magnetic characteristics which are compared with those of a reference magnetic means comprising the same number of magnetic members from the same batches as the identifying magnetic members. Identical characteristics provide a correct identification. The detection apparatus may comprise two exciter coils for providing two alternating magnetic fields and two detector coils for each field connected in opposition. When an identifying magnetic member inserted in one field is identical to the reference magnetic member inserted in the other field, detection signals from the two detector coils cancel each other out.

2 Claims, 2 Drawing Figures

METHOD OF IDENTIFYING ARTICLES

BACKGROUND OF THE INVENTION

The present invention relates to a method and apparatus for the recognition of marked objects. In this field, it is thought that such an apparatus is suitable for observing zones or premises to which access is strictly limited, for example for reasons of security.

The problem of checking the right of access to so-called "security" premises occurs, for example, in banks, in industrial establishments having dangerous areas which should be accessible only to experts, or in premises which are subject to restriction in the interests of national defence.

The systems used until the present, have ranged in various degrees of complexity, from a key or combination of keys to the use of "badges" which makes it possible to check the identity of persons entering such premises. These badges, which are frequently produced in the form of plastics cards, can be complemented by magnetic coding on magnetic strips which are stuck to, or incorporated in the card.

It is also known to detect, on an object or a person, the presence of a sample of a metal possessing particular magnetic characteristics, without direct contact with the detection apparatus. Systems of this kind are based on detection of the changes in an alternating magnetic field when the metallic sample passes through or approaches this field; they are used, for example, as anti-theft devices in public libraries.

The Assignees of the present application have provided improvements to this method for the detection of the presence of a marked object in the control zone, using means which make it possible to identify the object by reading a previously coded magnetic label which has been fixed to the object or is carried by a person. These methods of identification form the subject of French Patent Application Ser. Nos. 76/07,899 of Mar. 18, 1976 and of its two Additions 76/25,313 and 76/30,519, and also of Application Ser. Nos. 76/25,182 of Aug. 19, 1976 and of its Addition 76/30,520.

In accordance with these methods, a range of magnetic strips or wires are used, each of which possesses different hysteresis loops. The labels are then coded either by suitably choosing the nature of the metal, in order to define the relative position, in each half cycle, of the signal generated by each strip, or by suitably choosing the effective length of the strip, in order to define the amplitude of the signal, or by combining both these possibilities. This produces a digital or binary coding or a coding with a numerical base of, for example, 4 or 5, depending on the amplitude factors which can be detected without requiring undue sensitivity of the detection apparatus.

In these methods, it is therefore essential to use well-defined properties of the metal, particularly in order to ensure the reproducibility of the hysteresis loop belonging to each type. This involves complying with extremely precise characteristics in the process for the manufacture of each particular metal, for its heat treatment and even for its shaping into thin strips or wires.

All these known systems exhibit the common disadvantage that they still permit the possibility of fraud by production of "false keys". Even with the above-mentioned system which uses magnetic strips, it is possible that a potential defrauder, who has succeeded in obtaining a badge or coded label, could subsequently manage to reconstruct it using the same magnetic products.

SUMMARY OF THE INVENTION

The invention provides a method for the identification of an article marked by at least one member, such as a thin strip or wire made of a magnetic material having a hysteresis loop of approximately rectangular shape, by passing the article through an alternating magnetic field and analysing the disturbed field by means of a detection circuit.

One or more series of strips or wires may be used for marking the articles to be identified, each series originating from the same production batch and therefore possessing its own particular characteristics of composition, of manufacturing process and of heat treatment. Each series thus possesses a random shape of hysteresis loop which belongs strictly to this batch but is common to all other strips originating from this batch. In order to analyse the disturbed field, a reference disturbance, which is preferably equal and opposite to that generated by the marked articles, is generated in opposition in the detection circuit by means of reference magnetic members which originate from the same batch and are absolutely identical to those used for marking the articles. The article may then be detected by detecting the exact cancellation of the disturbance previously established in the detection circuit.

The invention also relates to an apparatus used for carrying out this method, including a detection circuit which comprises at least one detector coil into which the magnetic mark of the object to be detected is inserted. The detector coil is arranged in opposition to an auxiliary coil into which there is inserted a reference mark consisting of the same members as those of the mark of the object to be detected.

DESCRIPTION OF THE PREFERRED EMBODIMENT

Figure 1:
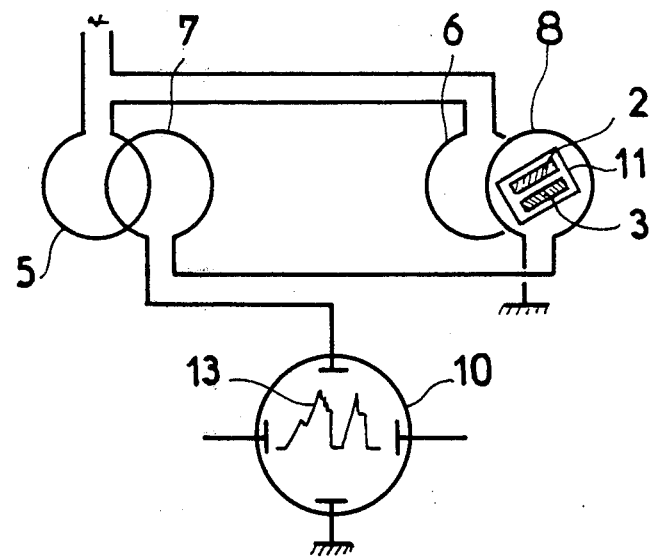
FIG. 1 is a schematic diagram of one embodiment of the invention.

Referring to the drawings, the object to be detected consists, in this case, of a customary plastic card 1 equipped with two magnetic strips 2 and 3, and this card constitutes the "key" for providing access, for example, to security premises. Thus, there exists only a precise and limited number of such cards which are distributed only to the persons authorised to enter these premises.

All such cards include a strip 2, laminated from the same batch of magnetic metal. However, in the processes for the manufacture of such a batch, for its heat treatment and for its lamination, it will not be strictly necessary to comply exactly with reference temperatures or heating times, or with the normal conditions for lamination, as is the case with the abovementioned previously proposed methods. As a result, the hysteresis loop of each strip possesses random, non-uniform and complex distortions compared with the theoretical loop for that material. On the other hand, all the strips originating from this same batch possess the same distortions and non-uniformities of the hysteresis loop.

The same applies to the strips 3 of all the cards, which are manufactured under similar conditions using another batch of magnetic material which may be different to the first-mentioned material.

The detection device comprises two exciter coils 5 and 6 which are fed with alternating current and which each accordingly produce an alternating magnetic field. The detection circuit comprises a detector coil 7 magnetically coupled to the exciter coil 5 in the detection zone. In the detection circuit, the coil 7 is set up in opposition to an auxiliary coil 8 magnetically coupled to the exciter coil 6. The overall signal produced by the two coils 7 and 8 is fed to processing equipment which can be of any known type. In this case, in order to simplify the arrangement, this apparatus has been represented schematically as the screen of an oscilloscope 10. The overall signal is developed across the vertical deflection plates and a reference A.C. signal (not shown) is fed across the horizontal deflection plates of the oscilloscope 10.

In the previously proposed arrangements, the detection apparatus is normally balanced so that no signal appears on the oscilloscope in the absence of any foreign magnetic element when the exciter coils are providing an alternating field. However, in this case (FIG. 1), a control card 11, carrying the same magnetic strips 2 and 3 as the card 1 to be detected, has been introduced adjacent or into the auxiliary coil 8. Signals 13, which have non-uniform and complex shapes characteristic of the hysteresis loops of the strips 2 and 3, then appear at the detection apparatus 10.

Figure 2:
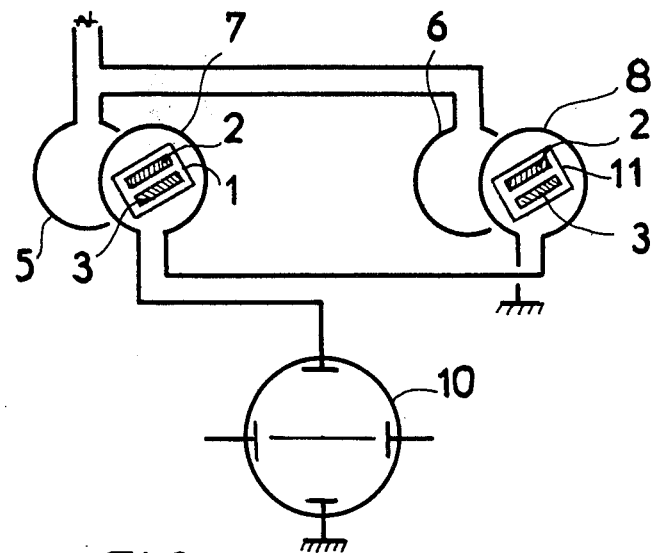
FIG. 2 is a diagram similar to that of FIG. 1, but including an article to be identified.

If a card 1 is to be detected is now introduced (FIG. 2) adjacent or into the detector coil 7, balance will be established in the detection circuit so that the signal appearing at 10 will be cancelled. A method is thereby provided for detecting the identical nature of the code carried by the card 1 and a reference code carried by the control card 11, by cancellation of the signal resulting from either card by the other card.

Thus, in practice, the numerical coding of the above mentioned systems has been replaced by an analogue coding which is practically non-reproducible, since it would be necessary to reconstruct very exactly both the composition of the batch and all the conditions of its manufacture and lamination, and this is virtually impossible to achieve.

The invention is not limited to that which has been described by way of example, and also includes embodiments which would only differ therefrom in detail or in the use of equivalent means. Thus, it would be possible to use cards which have a single strip or which have more than two strips, depending on the desired degree of complexity of the signal which is detected; likewise, it will be possible for the strips to be directly placed on the object or on a label, instead of being placed on a special card. In all these variations, the essential point is that the magnetic members of the articles should all originate respectively from the same batch, and that the reference member or members introduced into the auxiliary coil should also be made from those same batches.

The strips or wires forming the marks could also be made of non-metallic magnetic materials, for example ferrite or magnetic ceramic, on condition that they originate from the same production batch of material, thereby ensuring that the complex shape of the hysteresis loop remains identical for all articles.

What we claim is:

1. In a method of identifying an article provided with identifying magnetic means by positioning said magnetic means in an alternating magnetic field and detecting the resultant disturbance caused to said magnetic field using a detection circuit, the improvement comprising: providing the identifying magnetic means by selecting at least one magnetic member from at least one production batch, each production batch possessing its own particular characteristics of composition, manufacturing process and heat treatment, providing a random shape of the hysteresis loop thereof, which belongs strictly to the said production batch but is common to all members originating from said batch; providing a reference magnetic means comprising an equal number of magnetic members as said identifying magnetic means and from said production batches; using said reference magnetic means to create a disturbance, which is equal to that created by said identifying magnetic means, in opposition in said detection circuit; and identifying said identifying magnetic means by detecting the exact cancellation of the disturbance in said detection circuit.

2. Apparatus for identifying an article provided with identifying magnetic means comprising: a detection circuit comprising at least one detector coil for generating said first-mentioned alternating magnetic field to be disturbed by said identifying magnetic means, an auxiliary coil for generating a second magnetic field disturbed by said reference magnetic means and arranged to create a disturbance in said detection circuit which is opposite to that created by said identifying magnetic means, and detection means for detecting the disturbance in said detection circuit.

* * * * *